May 16, 1967 G. BANCHIERI 3,320,447
ELECTRIC SYNCHRONOUS MACHINE, WITH ROTOR CONDUCTORS
DIRECTLY COOLED BY A LIQUID
Filed Sept. 15, 1964 4 Sheets-Sheet 4
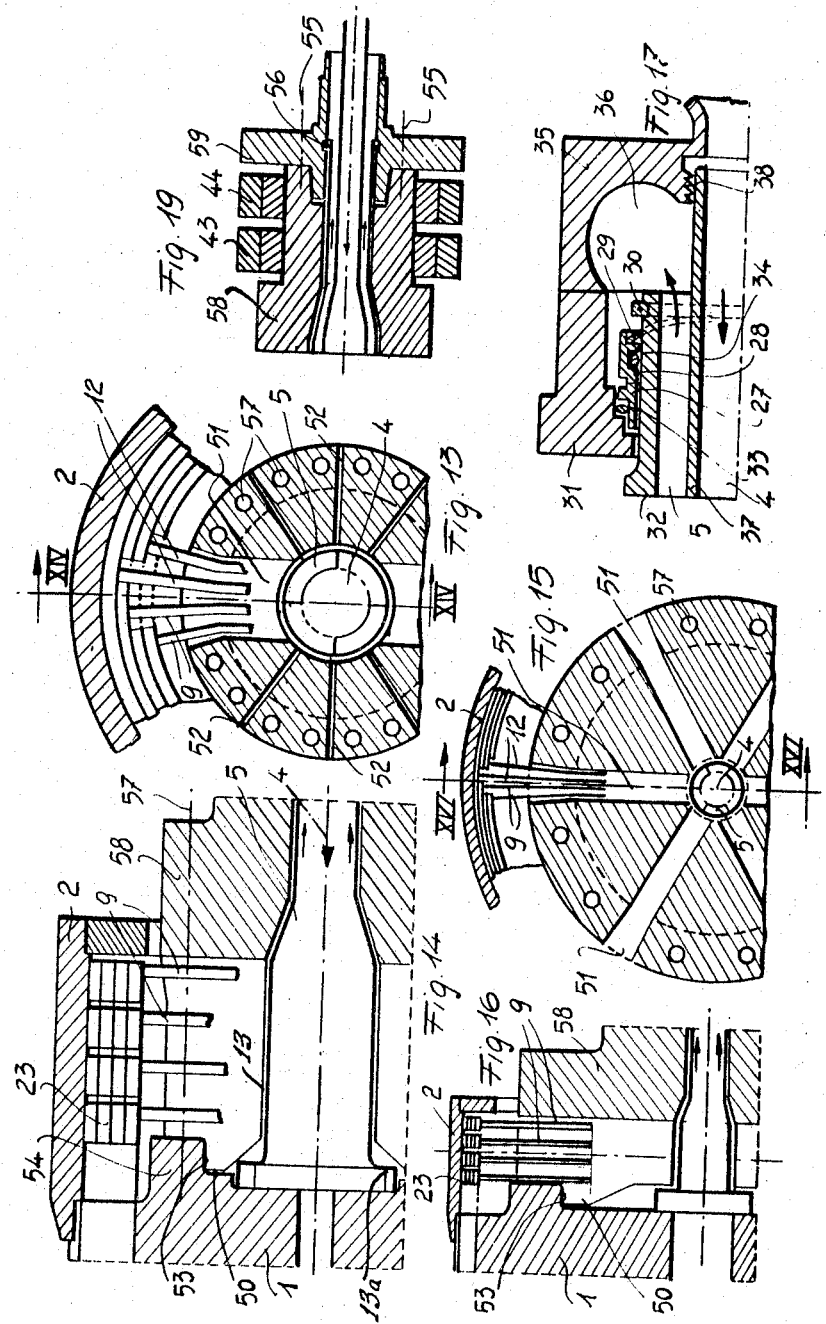
INVENTOR
Giuseppe Banchieri
BY
Michael J. Striker
ATTORNEY

United States Patent Office 3,320,447
Patented May 16, 1967

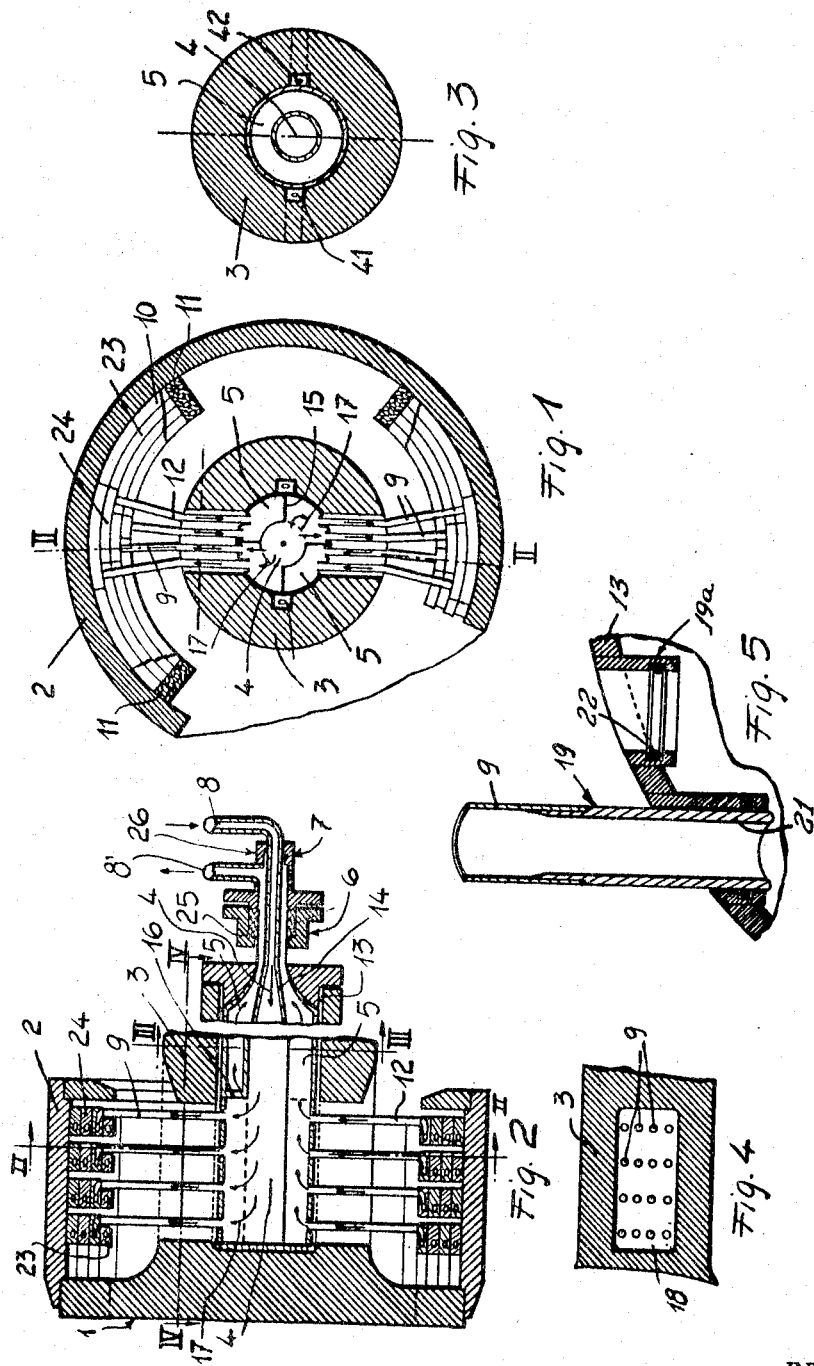

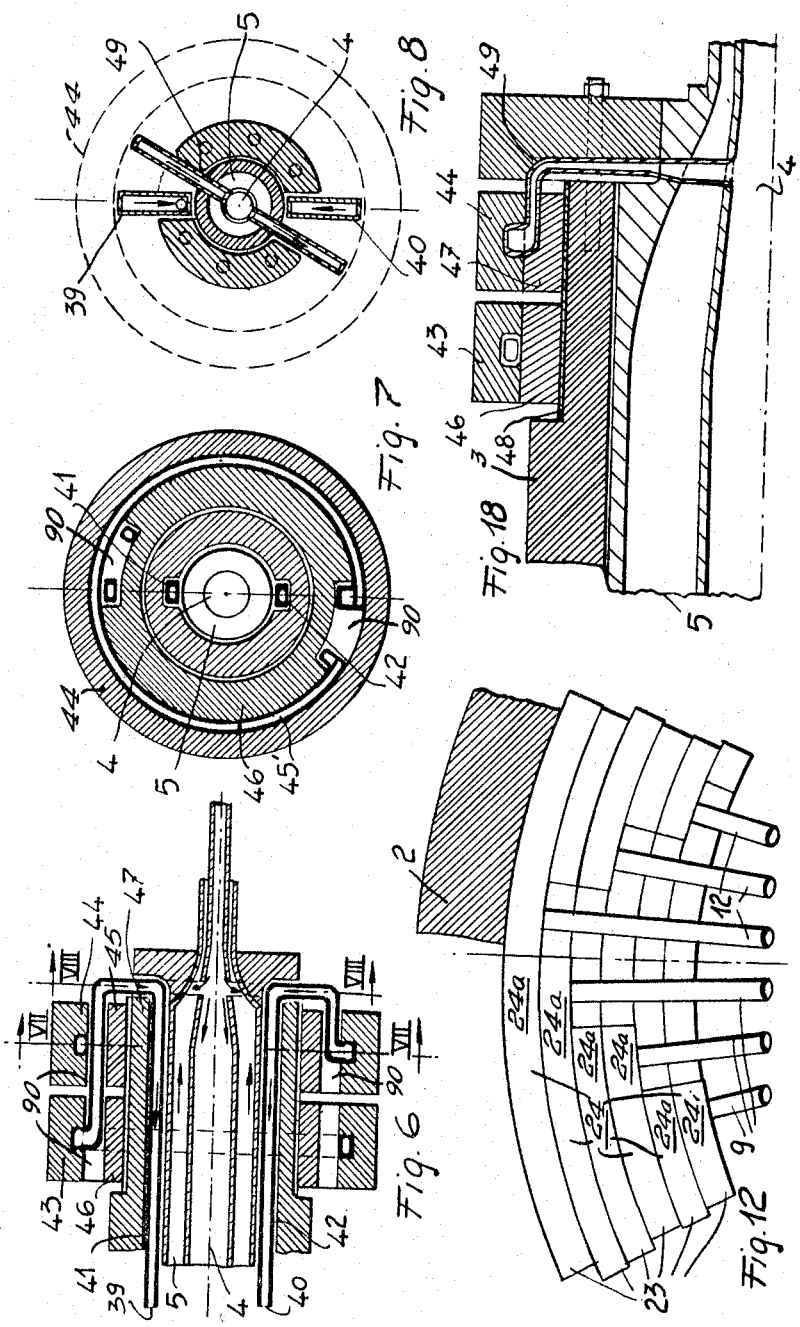

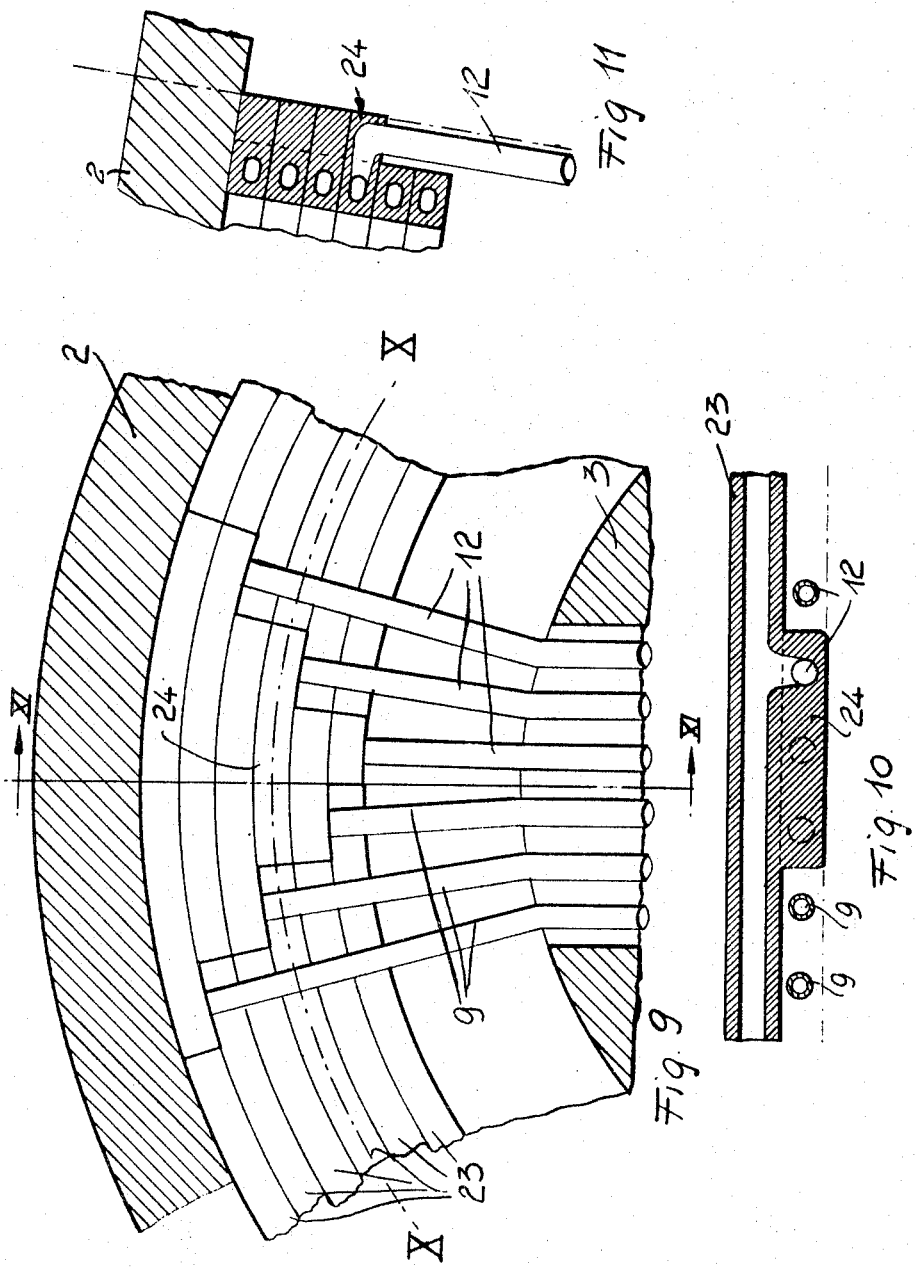

3,320,447
ELECTRIC SYNCHRONOUS MACHINE, WITH ROTOR CONDUCTORS DIRECTLY COOLED BY A LIQUID
Giuseppe Banchieri, Via S. Massimo 3, Padova, Italy
Filed Sept. 15, 1964, Ser. No. 396,537
Claims priority, application Italy, Sept. 24, 1963, 705,628/63; June 1, 1964, 12,047/64
14 Claims. (Cl. 310—54)

This invention relates to a generator, and preferably to a turbogenerator, with rotor conductors directly cooled by a liquid.

The invention has as purpose to provide a highly effective cooling of electric machine up to limits which would not be expedient to exceed, said limits being imposed by difficulties which would be encountered in the dimensioning of the magnetic circuit and represented by an unacceptable decrease in the efficiency of the machine.

According to already known techniques, in the field of large turboalternators, preference is more and more being given to direct cooling—with distinct advantages deriving from the use of particularly efficient cooling fluids—over the indirect cooling with air in a closed circuit (with heat flow through the insulating material, toward the mass). It is thus justified the conversion from air cooled machines, to machines wherein the stator is directly cooled with hydrogen compressed up to higher and higher pressure values, or even with a liquid—at least limitedly to the machine stator.

The liquid to be used for the cooling of rotor according to the invention shall obviously have high electric insulating properties, a low viscosity and a high density and heat capacity. The selection of a cooling fluid (e.g. distilled water having suitable properties, or extra-fluid oil) depends upon its marked thermotechnic superiority, over the gases, thus giving the possibility to highly enhance all advantages of the direct cooling.

In the machine according to the invention, particularly high utilization values of the active material (copper) can be attained, while keeping the overtemperatures of the material at moderately low levels. A different distribution of the various losses in respect to conventional machines, also occurs, with a very marked preponderance of the copper losses (mostly in the rotor copper), while the mechanical losses—inclusive of those caused by the circulation of cooling liquid—will be particularly low, amounting to a few percent on the total only.

As an overall result, the efficiency will be much similar to that of a conventional machine having the same air gap sizes.

The direct liquid cooling, allows construction of machines having a power output much higher than that of conventionally designed machines and undoubtedly unattainable in any other way. The added advantage of a material decrease in the weight of machines per power unit, will result in a proportional decrease in the direct and indirect costs.

The above and further features will be better appreciated from a consideration of the following detailed description, taken with the accompanying drawing, both description and drawings being given merely as a nonrestrictive example. In the drawings:

FIG. 1 is a diagrammatic cross-sectional view according to line I—I of FIG. 2, taken on a group of conductor heads.

FIG. 2 is a partial longitudinal section, taken on the line II—II of FIG. 1.

FIG. 3 is a cross section taken on the line III—III of FIG. 2.

FIG. 4 is a partial section taken on the line IV—IV of FIG. 2.

FIG. 5 is an enlarged detail of FIG. 1, showing an expansion joint and the insulating length of pipe by which the cooling liquid is fed to rotor head.

FIG. 6 is a partial longitudinal section of rotor, taken across the slip rings.

FIG. 7 is a cross section taken on the line VII—VII of FIG. 6.

FIG. 8 is a cross section taken on the line VIII—VIII of FIG. 6.

FIG. 9 is a diagrammatic section, showing how the radial pipes are connected with the heads.

FIG. 10 is a section taken on the line X—X of FIG. 9.

FIG. 11 is a partial section taken on the line XI—XI of FIG. 9.

FIG. 12 is a variant of the embodiment form shown in FIG. 9.

FIG. 13 is a variant of the embodiment form shown in FIG. 1.

FIG. 14 is a cross-section taken on the line XIV—XIV of FIG. 13.

FIG. 15 is a cross-section similar to that of FIG. 13, showing however a six-pole machine.

FIG. 16 is a cross-section taken on the line XVI—XVI of FIG. 15.

FIG. 17 is a cross-section of a detail of the fittings through which the cooling liquid is allowed to flow from the stator to rotor and vice-versa.

FIG. 18 is a diagrammatic partial section of rotor, taken across the slip rings; and, FIG. 19 is a section similar to that of FIG. 6, of a modified embodiment form.

All liquid inlets and outlets will be advantageously located near the middleline of the heads on the side opposite to that of the turbine. Thus, the cooling liquid shall flow along at least one complete turn from the inlet to the outlet. Each pole of the machine will be provided with two adjacent nests of tubular connections, originating from the head middle section and extending in a nearly radial direction; one of the nests having the purpose of feeding, and the other of discharging the cooling liquid to and from the hollow conductors, respectively.

Referring now in more detail to FIGS. 1 and 2, 1 is the rotor (of which only the end opposite to the turbine is shown in the FIG. 2); 2 is the rotor hood, and 3 is a prolongation of the rotor, which supports the slip rings. Two axial headers 4 and 5 are formed in the prolongation 3, as explained in more detail later on, being the header 4 designed to convey the incoming cooling fluid, while the header 5 is designed to convey the outgoing liquid.

The headers end in a pair of joints 6 and 7, which provide a dynamic sealing, and that are designed to establish a communication with the static portion of the closed cooling circuit, thereby allowing a flow of cooling liquid in the direction of arrows. These joints will be described in more detail—but as a not restrictive example only—later on.

The cooling liquid coming from a pipe 8 flows through the joints 6 and 7 and reaches the header 4 wherefrom it flows, through a number of substantially radial conduits 9 to the conductor heads 10. The conductor portions forming the heads are also hollow, as the conductor portions 11 are which extend in the rotor slots. At approximately the central point of each head conduits 9 are connected hydraulically with the conductors which form the rotor windings.

The cooling liquid, will flow along the conductor portion extending in a slot then out of the conductor at the opposite side of the machine, and into the adjacent hollow conductor portion extending in the related slot and it flows out from the head adjacent to the inlet head, wherefrom the liquid flows through the radial conduit 12 into the header 5 to be finally discharged from the machine through pipe 8′. As can be readily appreciated from the above description the liquid will flow through a whole turn between inlet and outlet; however, in the case of shorter machines, the cooling liquid might be led through two or more turns, by suitably shifting the inlets and outlets of the cooling fluid.

The inlet conduit nest 9 and the outlet conduit nest 12 communicate, each with the corresponding header 4 and 5 respectively. Said headers are partially, defined by two co-axial cylindric walls 13 and 14, and are connected through the joints 6 and 7 with the two stationary headers 8 and 8′. The header 5 is subdivided by suitable partition walls 15 and 16 into two circular sections wherein the conduits 9 end, while the header 5 is provided with two perforated wall sections 17, shown in dash lines communicating with two circular section conduits wherein the collecting conduits end.

With the above arrangement the differences shown by the rotor, when compared with that of conventional machines, mainly consist in an increase in the diameter of the axial hole (at one end of rotor), for the insertion of the cylindric body which forms the two headers 4 and 5. A radial bore 18, having a rectangularly shaped cross-section, and sizes adequate to accommodate the nests of radial conduits 9 and 12, is also required in front of each pole (see FIGS. 1 and 4).

The radial conduits 9 and 12 will extend in a strictly radial direction in respect of rotor for a given portion of their length, and therefore they are stressed by centrifugal force directed along their axes while the transversal components of centrifugal forces acting on said radial conduits in the less radial remainder of their length (wherein their axes are parallel) are taken-up by adequate layers of interposed spacers, made of a suitable insulating material. To minimize the number of radial conduits (and to ensure a sufficient size thereof) thus facilitating the solution of constructional problems and allowing also higher flowrates for the liquid, it is expedient that the sizes of conductors be large and such as to minimize the number of slots, in the rotor and particularly the number of conductors per slot. As regard the radial conduits, they are made—like the most part of the hydraulic circuit outwardly of the electric hollow conductors—from a material having a very good mechanical resistance, as well as a superior chemical stability, e.g. a good grade of stainless steel.

To facilitate the assembly and to obtain a better design, it is expedient to have the conduits made up from a number of tubular sections reciprocally welded and having a thicker wall in the more peripheral sections. In the zones of least centrifugal stress and lowest pressure of each radial conduit (i.e. near the connection with the cylindric body of the axial headers) there is provided an insulating tube section 19 and an expansion and sealing joint 19a (see FIG. 5). Said insulating pipe section 19 is secured at one end to the end section of a conduit 9 or 12. The length of said insulating pipe section 19 is such that the column of liquid contained therein is capable of withstanding (with a large safety margin), owing to their insulating properties, the operating voltage, and of minimizing the current towards ground. However, due to rather low voltages prevailing in the rotor, short lengths of insulating pipe section will be sufficient. The sealing and expansion joint 19a is designed to compensate the small aixal movements of the conduits 19, 19a caused by the centrifugal force, and to relieve the stresses in the weakest points (i.e. in the welded seams and insulating tube lengths) as well as to make the conduits independent from the headers from a static point of view. Such joints are formed by a packing ring 22 located in a slot of a short length of pipe 20, welded to the wall 13 and surrounding the end 21 of the insulated pipe section 19. The seat for the packing ring 22 may be alternatively formed in the insulated pipe section 19. A critical point is represented by the connections of conductor heads with the radial conduits. The design of the conductor, which term is used to designate that portion of the conductor which extends circumferentially between two corresponding rotor ribs, is practically similar to conventional designs, except for a few limitations and slight changes due to the presence of radial conduits. It is only necessary to have the conductor head conveniently widened near the middleline thereof to allow the welded connection with the conduit 9, 12. All adjacent conductors which are positioned more outwardly than the conductor which is connected with the first radial conduit, are likewise widened in an axial direction to ensure a good mutual support, as well as a proper support for the conduit subjected to centrifugal force.

Thus, e.g. (see FIGS. 9, 10 and 11, that refer to a machine having six conductors for each slot) the head 23 of each conductor is axially widened across the section 24 to accommodate the radial conduits 9, as well as to absorb the radial stresses exerted not only by its own conduit, but also those exerted by the conductor heads located nearer the rotor axis, and to convey them to conductor heads located nearer the air gap and in point of fact to the hood 2, the purpose of which is to collect the centrifugal actions exerted on the heads. Thus, the widened (i.e. with a larger cross-sectional area) lengths of the heads, will develop greater and greater in circumferential direction from the rotor axis toward the periphery.

It is expedient that all inlet conduits be directed to the right (or to the left) in respect of the middleline of the heads so to be connected always with conductors of even order (or respectively of odd order) in each slot, and vice-versa for the outlet conduits.

Conversely, in a variant (see FIG. 12), the conductor portions which extend along the rotor head are wider than the conductor portions which are located in the rotor slots except for the sections which are located above the inlet and outlet conduits to obtain a passage for the conduits, the ends of which will be welded to the corresponding conductor head. The narrower head sections will have a stepped down development in the circumferential direction, from the axis toward the periphery.

The above variant allows a certain reduction in the rotor losses, as well as a more consistent distribution of centrifugal stresses across the rotor hoods.

The joints 6 and 7—which in FIG. 1 are diagrammatically shown as furnished with a stuffing box 25 and 26—are provided to allow the cooling liquid to flow from the stator to rotor, and vice versa.

A more detailed representation of these joints is shown in FIG. 17. The joints are not much different from those usually adapted for obtaining a sealed connection of a shaft rotating in a hole as e.g. in pumps. A seal may be obtained, e.g. by means of a stationary ring 27 and a movable ring 28, both mirror finished, and axially urged into mutual contact by a spring washer 29, which in turn is locked by a lock washer 30. Between the sealing ring 27 and the stationary member 31 there is at least a sealing member 33; also between the sealing ring 28 and the rotating member 32 (which defines together with tube 37 the headers 4, 5) there is provided a sealing annulus 34. The stationary member 31 is connected to the machine bed or connected with the rotary member 32 by means of ball or roller bearings. A casing 35 which is internally formed with a scroll 36 has the purpose of conveying the coolant to the outside and is secured, e.g. by means of bolts, to the stationary member 31.

The rotary member 32, acting as a support for the rotary sealing ring 28, obviously consists in a tubular extension of the outer header, while the inner header, concentric thereto, is formed with an extension 37, that rotates in abutment with the stationary member 35, there being merely provided a labyrinth seal 38 to sufficiently restrain any possible passage of cold liquid (in 4), to warm liquid (in 5). This second seal can be made in a so simple way because, while the first seal must practically prevent all liquid leaks from the outer collector, said second labirinth seal is merely intended to decrease the leaks of cold liquid, often under a given pressure, from the inside header where the heated fluid flows into the outer header. Owing to the high values of electric current circulating in the machine, it may be very convenient to cool both winding ends and the rotor rings to which said winding ends are connected. Each one of the winding ends 39 and 40 shaped as an hollow bar and insulated against ground is led into longitudinal slots 41 and 42, (see FIGS. 3, 6) and reaches the corresponding collector ring 43 and 44 (see FIGS. 6, 7 and 8) and then extends, as a mere tubular duct, through the ring body to ensure a proper cooling thereof, whereafter it leads, through a connecting piece (comprisive of an insulating pipe length for the insulation against the mass) into one of said two axially concentric collectors 4 and 5 for the cooling liquid. By such arrangement, the cooling liquid flows into one collector ring, thus cooling it, along with the related winding end, and possibly the adjacent turn. Thus, the collector rings will be cooled in a particularly efficient manner, whereby the moderate increase in the temperature of turn copper. The two collector rings 43 and 44 can be conveniently tightly fitted on two steel rings, previously shrunk on the shaft, with the interposition of an insulation 48 (FIG. 18). Symmetrically located axial slots, formed on the outer surface of steel rings 46 and 47 allows for the passage of both winding ends 39, 40, also suitably insulated. The possibility is given to have a cooling duct 45' under the form of an open ring, welded to the inside of each collector ring. The ends of said duct extend then, in parallel relation with one another, firstly in an axial direction, and then (after having reached the rotor shaft front side) in a radial direction, whereafter one of said ends will form part of one winding end, while the opposite end leads (with the interposition of a length of insulating material) into the pipe connection 49, that is welded to the header 4 (in the FIG. 18) to the cooling liquid header. Such embodiment allows an easy insulation of the hollow winding ends, a likewise easy assembly, requiring only a few welds in accessible positions and prevents a weakening of the collector rings which are always highly stressed by centrifugal forces.

According to a variant concerning the design of the rotor (shown in FIGS. 13 to 16 inclusive) which has distinct advantages, since it makes more easily accessible to servicing a number of parts of the rotor cooling circuit, the rotor body is not made in one piece (as in conventional designs), but the rotor shaft 38, which is opposite to the turbine coupling side and contains the headers 4 and 5, is made as a separate unit and is connected with the main rotor body 1 by means of a flange and screw studs. Two large radial slots 51 for accommodating the bundles of tubes 9 and 12 are formed (in the case of bipolar machines) on the front side 50 of said rotor shaft 58, near the point where said shaft is connected with the rotor main body 1. A further subdivision of said front side is provided by means of a series of narrow radial slots 52 (which can be obtained, in the most of cases, by saw cuts). In the case of multipolar machines (see FIGS. 15 and 16 wherein a six-pole machine is shown), no further radial slots are required in addition to those strictly needed to accommodate the bundles of radial pipes (being obviously one slot needed for each machine pole). In this manner, the different sectors into which the front side of said shaft is subdivided, near the point at which it is connected with the rotor main body will be stressed, when the machine is in operation mainly by centrifugal forces acting in a radial direction.

By having the terminal end of each sector formed with a suitably tooth-shaped projection 53, resting on a crown 54 that is formed, on the front side of the rotor main body and by tightly clamping the whole through stud bolts 57, the selectors will behave under centrifugal stress like rather short beams fixed at one end and merely hingedly supported at the opposite end, and with stresses within admissible limits even in machines of the largest sizes. By this arrangement it is possible to assemble the cylindric body 13 defining the headers 4, 5 (by means of a suitable flange 13a welded thereto, stud bolts and nuts which can be conveniently countersunk for decreasing the overall dimensions) before mounting the rotor shaft by which it is enclosed. In this manner, an improvement in the accessibility of cooling system is obtained, and in addition a greater freedom in the choice of diameter of cylindric body 13 of the headers is given; such diameter can be then suitably decreased in the section near the rotor shaft, as well as—and in a greater degree—near the rotor slip rings. Also the outer end terminal 59 of the shaft beyond the rotor slip rings can be conveniently made as a separate piece and secured by means of stud bolts 55 (FIG. 19), whereby it can be utilized as a support for the dynamically sealing devices as shown in FIG. 17. A suitable static sealing device (mainly an O-ring 56 fitted in an annular groove) is mounted between the cylindric body 13 of the headers and said outer terminal end of the shaft in order to compensate for small, mutual shiftings due to heat expansion, and to prevent leaks of liquid between both components.

Cooling of stator

For machines with highly efficient cooling of the rotor, an adequately strong stator cooling—even of the direct type, with a liquid—is to be selected. Suitable solutions have already been adopted in practice. Obviously, the technological problems are less severe than in the case of the rotor, and suitable choices can be made more easily.

Application to machines of middle ratings

It should be noted that the abovedescribed cooling practices can be applied also to medium rated machines when a few constructional simplifications, intended to decrease costs, are adopted. In particular, it will be possible to decrease the number of rotor inlets and outlets of cooling liquid for the winding, in respect to previously stated maximum (as described before, the liquid can be caused to flow through two or more complete turns between inlet and outlet).

What I claim is:

1. A liquid cooled armature for an electric generating machine comprising a rotor; a plurality of coils including hollow conductors each having an end turn extending axially beyond and having a section extending circumferentially of said rotor, said sections of said conductors being stacked in radial direction and located substantially in a plane which is normal to the rotor axis and each section having a connecting portion, the length in circumferential direction of successive connecting portions increasing in a direction away from the rotor axis and said connecting portions including an innermost portion nearest to the rotor axis and additional portions located further away from said axis; liquid conveying means located in the region of said rotor axis; and conduits connecting said liquid conveying means with said connecting portions, each conduit which is connected to one of said additional portions bypassing each connecting portion which is nearer to the rotor axis.

2. A liquid cooled armature according to claim 1, wherein said connecting portions are arranged in stepwise fashion and are located substantially in a second plane parallel to said first mentioned plane.

3. A liquid cooled armature according to claim 2, wherein said conduits extend substantially radially with respect to the axis of said rotor and are located in said second plane.

4. A liquid cooled armature according to claim 1, further comprising cover means connected to said rotor and embracing the outermost of said sections to prevent outward movement thereof during rotation of said rotor about its axis.

5. A liquid cooled armature according to claim 1, said liquid conveying means including inlet means and outlet means and said conduits connecting successive ones of said conductor sections respectively, with said inlet and with said outlet means.

6. A liquid cooled armature according to claim 5, said rotor comprising a shaft extending axially therefrom and defining a pair of substantially concentric internal fluid passages which constitute at least a portion of said inlet and said outlet means, respectively.

7. A liquid cooled armature according to claim 1, each of said conduits including an insulating portion intermediate said conveying means and the corresponding connecting portion.

8. A liquid cooled armature according to claim 1, further including shaft means extending from said rotor, said liquid conveying means being disposed in said shaft means, each of said conduits including a tubular portion extending into said shaft means and communicating with said liquid conveying means, all of said tubular portions being substantially parallel to each other.

9. A liquid cooled armature according to claim 8, further comprising expansion joint means connecting each of said tubular portions to said shaft means.

10. A liquid cooled armature according to claim 1, wherein each of said connecting portions comprises a projection extending axially beyond and circumferentially of the corresponding conductor section, all of said connecting portions being located substantially in a second plane parallel to said first mentioned plane, said connecting portions being arranged in stepwise fashion in said second plane and each of said conduits being also located substantially in said second plane.

11. A liquid cooled armature according to claim 1, wherein said conduits comprise the only means of communication for cooling liquid between said liquid conveying means and said hollow conductors, all of said conduits being located on the same side of said rotor.

12. A liquid cooled armature according to claim 1, wherein said connecting portions are located substantially in the central region of the respective conductor sections.

13. A liquid cooled armature according to claim 1, further comprising hollow slip rings and conduit means connecting said conveying means with said slip rings.

14. A liquid cooled armature according to claim 1, wherein each of said connecting portions defines an internal substantially axial passage communicating with the interior of its respective hollow conductor.

References Cited by the Examiner
UNITED STATES PATENTS

| | | | |
|---|---|---|---|
| 2,950,403 | 8/1960 | Kilner et al. | 310—232 |
| 3,034,003 | 5/1962 | Seidner | 310—61 |
| 3,097,317 | 7/1963 | Fechheimer | 310—54 |
| 3,131,321 | 4/1964 | Gibbs et al. | 310—54 |

MILTON O. HIRSHFIELD, *Primary Examiner.*

ORIS L. RADER, *Examiner.*

L. L. SMITH, *Assistant Examiner.*